(12) United States Patent
Hernandez Aguilar et al.

(10) Patent No.: US 12,349,674 B2
(45) Date of Patent: *Jul. 8, 2025

(54) SOLUTIONS AND METHODS FOR FORMING AN EXOGENOUS FLEXIBLE FILM ON A PLANT AND PLANTS INCLUDING THE EXOGENOUS FLEXIBLE FILM

(71) Applicant: Cultiva, LLC, Las Vegas, NV (US)

(72) Inventors: Luis Fernando Hernandez Aguilar, Las Vegas, NV (US); Brian James Tipton, Las Vegas, NV (US); Sean Calvin Musser, Las Vegas, NV (US); John Mark Christensen, Corvallis, OR (US)

(73) Assignee: Cultiva, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,500

(22) Filed: Jul. 14, 2023

(65) Prior Publication Data

US 2023/0354802 A1    Nov. 9, 2023

Related U.S. Application Data

(63) Continuation of application No. 16/197,721, filed on Nov. 21, 2018, now Pat. No. 11,737,454.

(60) Provisional application No. 62/591,059, filed on Nov. 27, 2017.

(51) Int. Cl.
*A01N 25/04* (2006.01)
*A01N 25/24* (2006.01)
*A23B 7/16* (2006.01)

(52) U.S. Cl.
CPC ............. *A01N 25/04* (2013.01); *A01N 25/24* (2013.01); *A23B 7/16* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 3,847,641 A | 11/1974 | Cushman et al. | |
| 7,222,455 B2 | 5/2007 | Schrader | |
| 8,725,328 B1 | 6/2014 | Kaiser et al. | |
| 11,737,454 B2 * | 8/2023 | Hernandez Aguilar | A01N 3/00 800/298 |
| 2001/0039246 A1 | 11/2001 | Duan et al. | |
| 2004/0146617 A1 | 7/2004 | Schrader | |
| 2012/0042420 A1 | 2/2012 | Kaiser et al. | |
| 2019/0159446 A1 | 5/2019 | Hernandez Aguilar et al. | |
| 2019/0281819 A1 | 9/2019 | Hernandez et al. | |
| 2023/0016007 A1 | 1/2023 | Hernandez Aguilar et al. | |

FOREIGN PATENT DOCUMENTS

WO    2010124131 A1    10/2010

OTHER PUBLICATIONS

Sugiura et al., "Changes in the taste and textural attributes of apples in response to climate change," Scientific Reports (Aug. 15, 2013), 3, 2418; DOI:10.1038/srep02418, pp. 1-7.
"Put on Parka+ for the Best Rain Protection", Mar. 1, 2015 (Mar. 1, 2015), pp. 1-2, XP055915944, U.S.A., Retrieved from the Internet: URL:http://www.cultivaipm.com/wp-content/uploads/2014/06/Parka-Sell-Sheet_03_15.pdf [retrieved on Apr. 27, 2022].
Zhao et al.: "Melatonin and its potential biological functions in the fruits of sweet cherry", Journal of Pineal Research, vol. 55, No. 1, Mar. 11, 2013 (Mar. 11, 2013), pp. 79-88, XP055915945, DK, ISSN:0742-3098, DOI: 10.1111 /jpi.12044, Retrieved from the Internet: URL: https://api.wiley.com/onlinelibrary/tdm/v1/articles/10.1111 %2Fjpi.12044.
Fadon et al.: "Flower development in sweet cherry framed in the BBCH scale", Scientia Horticulturae, vol. 192, Aug. 1, 2015 (Aug. 1, 2015), pp. 141-147, XP055915949, Amsterdam, NL, ISSN: 0304-4238, DOI: 10.1016/j.scienta.2015.05.027, Retrieved from the Internet: URL:https://citarea.cita-aragon.es/citarea/bitstream/10532/2981 /1 /2015_ 161.pdf.
Palma et al., "Bacillus thuringiensis Toxins: An Overview of Their Biocidal Activity", Toxins, (2014), 6, pp. 3296-3325.
Usla, C., "Microorganisms In Biological Pest Control—A Review (Bacterial Toxin Application and Effect of Environmental Factors)", Current Progress in Biological Research, Apr. 24, 2013 {Apr. 24, 20 13), Chapter 13, pp. 287-318.

* cited by examiner

*Primary Examiner* — Alton N Pryor
(74) *Attorney, Agent, or Firm* — Kolitch Romano Dascenzo Gates LLC (57) ABSTRACT

Solutions and methods for forming an exogenous flexible film on a plant and plants including the exogenous flexible film. The solutions include a solvent, a film forming matrix component, a hydrophobic barrier component, a plasticizing component, and a film enhancing component. The methods include spraying the solution on the plant. The methods also include evaporating at least a fraction of the solvent from the solution to form the exogenous flexible film. The plant includes fruit, and the spraying includes spraying at least 45 days prior to harvesting the fruit. The plants include an exogenous flexible film formed from the solutions and/or by the methods.

13 Claims, 4 Drawing Sheets

FIG. 1

| Sample # | Application Information (Days Before Harvest) | | | | % without MF |
|---|---|---|---|---|---|
| | 69 | 59 | 34 | 24 | |
| A1 | X | | | | 86 |
| A2 | X | X | | | 84 |
| A3 | X | X | X | | 84 |
| A4 | X | X | X | X | 84 |
| A Control | | | | | 70 |

FIG. 2

| Sample # | Application Information (Days Before Harvest) | | | | % without MF |
|---|---|---|---|---|---|
| | 64 | 34 | 19 | | |
| B1 | X | X | | | 65 |
| B2 | | X | X | | 45 |
| B Control | | | | | 37 |

SOLUTIONS AND METHODS FOR FORMING AN EXOGENOUS FLEXIBLE FILM ON A PLANT AND PLANTS INCLUDING THE EXOGENOUS FLEXIBLE FILM

RELATED APPLICATION

This application is a continuation of U.S. Nonprovisional patent application Ser. No. 16/197,721, filed Nov. 18, 2018 and is titled SOLUTIONS AND METHODS FOR FORMING AN EXOGENOUS FLEXIBLE FILM ON A PLANT AND PLANTS INCLUDING THE EXOGENOUS FLEXIBLE FILM, which is a non-provisional of and claims priority to U.S. Provisional Patent Application No. 62/591,059, filed on Nov. 27, 2017 and is titled SOLUTIONS AND METHODS FOR FORMING AN EXOGENOUS FLEXIBLE FILM ON A PLANT, the complete disclosures of which are hereby incorporated by reference.

FIELD OF THE DISCLOSURE

The present disclosure relates generally to solutions and methods for forming an exogenous flexible film on a plant and to plants including the exogenous flexible film.

BACKGROUND OF THE DISCLOSURE

Products produced from plant-based materials are impacted by the productivity of the plant during the growth cycle, as well as by the stability of the products post-harvest. Infestation with insects, microbes, and/or poor weather conditions may cause losses in productivity and/or damage to the plant. In many instances, methods of protecting, or mediating, the plants' sensitivity to such conditions have a negative impact on the environment because they involve the introduction of harmful chemicals in the form of fertilizers and pesticides. Thus, there exists a need for improved solutions and methods for forming an exogenous flexible film on a plant and/or for plants that include the improved exogenous flexible film.

SUMMARY OF THE DISCLOSURE

Solutions and methods for forming an exogenous flexible film on a plant and plants including the exogenous flexible film. The solutions includes a solvent, a film forming matrix component, a hydrophobic barrier component, a plasticizing component, and a film enhancing component. The solvent consists essentially of water and the solution includes at most 62 wt % of the solvent. The solution consists essentially of at least 0.5 wt % and at most 3 wt % of the film forming matrix component. The solution consists essentially of at least 12 wt % and at most 25 wt % of the hydrophobic barrier component. The solution consists essentially of at least 4 wt % and at most 15 wt % of the plasticizing component. The solution consists essentially of at least 12 wt % and at most 20 wt % of the film enhancing component.

The methods include spraying the solution on the plant. The methods also include evaporating at least a fraction of the solvent from the solution to form the exogenous flexible film. The plant includes fruit, and the spraying includes spraying at least 45 days prior to harvesting the fruit. The plants include an exogenous flexible film formed from the solutions and/or by the methods.

DETAILED DESCRIPTION AND BEST MODE OF THE DISCLOSURE

The solutions and methods disclosed herein may be utilized to form, define, and/or create an exogenous flexible film on a plant. The exogenous flexible film may, or may be utilized to, protect the plant from environmental conditions and/or from damage that may be caused by insects, microbes, moisture, and/or weather. One mechanism via which the disclosed solutions and methods accomplish these goals is via decreasing a susceptibility to, or a potential for, cuticle cracking, within the plant, under conditions of high moisture, such as heavy rainfall. As used herein, the term "plant" may refer to any suitable plant, portion of a plant, and/or part of a plant, examples of which include stems, roots, branches, leaves, flowers, fruits, nuts, and/or vegetables.

In field trials, comparing samples treated with the disclosed solutions and methods with untreated samples and/or competing treatments, the solutions and methods disclosed herein have demonstrated a significant decrease in the percentage of cracked fruit. In these trials, a variety of other benefits also were observed in the samples treated by the solutions and methods disclosed herein. Some of these benefits include improved finish on apples and an increased yield with almonds. Observations of improved plant productivity may be attributed to a decrease in stressful conditions on the plant; however, the disclosed solutions and methods appear to do more to the plant than simply remove stresses. Treatment by the disclosed solutions and methods also supplements the crop with necessary nutrition and further decreases the plant's environmental sensitivities.

Figure 1:
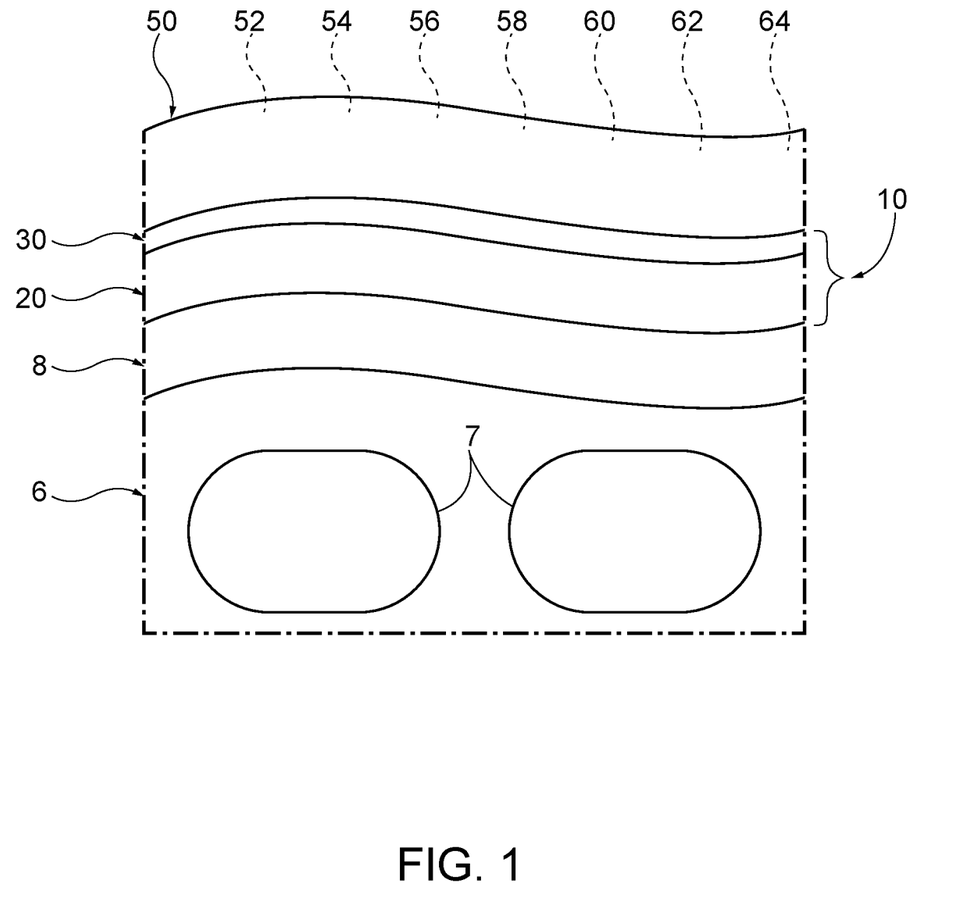
FIG. 1 is a schematic illustration of a plant cuticle that may be coated with an exogenous flexible film, according to the present disclosure.

The cuticle of a plant acts as an "armor" for protection from outside forces. Made up of two separate layers, the cuticle encompasses the cellular wall of the fruit, the leaves, the stems, and the trunk of the plant. A schematic example of a plant cuticle is illustrated in FIG. 1 and indicated at 10. Plant cuticle 10 may cover an epidermis 6 and acuticular layer 8 of the plant. The epidermis may include epidermal cells 7.

Cuticle 10 includes a first layer 20 of the cuticle that is a cutin-rich domain with embedded polysaccharides. This lipidic layer, which is made up of fatty acids that generally have 16 to 18 carbon atoms, defines a hydrophilic cell wall and possesses the ability to regulate nutrient transport into and/or out of the plant. First layer 20 also provides a flexible rigidity to the structure of the plant. In fruit, this layer is synthesized by the epidermis completely in the early stages of growth and as the fruit "balloons" out, it is stretched across the enlarging surface. During this stage of growth, any imperfections in the cuticle generally will extend into first layer 20 and may threaten the life of the fruit and/or may manifest as cracking of, or other damage to, the fruit.

A second layer 30 of the cuticle is made up of cuticular waxes. These waxes, both amorphous and crystalline, are hydrophobic and play a primary role in the plant's permeability to water. More specifically, the cuticular waxes control the flux of water that may diffuse into and/or out of the tissue of the plant according to Fick's Law:

$$J=P_c(Ci-Co) \quad (1)$$

Wherein J is the flux of water across the cuticle per unit area (g/m²s), (Ci–Co) is a difference in water concentration across the cuticle (g/m³), and $P_c$ is the conductance of the cuticle (m/s). The conductance is directly affected by the makeup of the cuticular waxes, more specifically, water permeability of the cuticle is inversely correlated with the amount of alkanes in the wax. Alkanes are a primary component of the wax layer and as their number increases, Pc decreases, reflecting a decrease in the flux of water. Apart from transpiration, the waxy cuticular layer also protects against UV radiation. While the cell wall defined by the first layer houses flavonoid pigments and phenolic molecules that screen and absorb UV-B radiation, the wax layer (second layer 30) also contains lipophilic phenolic compounds that assist in the screening of this radiation. In addition to screening UV radiation, the crystalline waxes in second layer 30 also reflect around 20-30% of incident UV waves thereby preventing harmful UV damage.

While the plant has all of these characteristics for protection naturally, a number of environmental and/or aging conditions may damage and/or inactivate these naturally occurring methods of protection. These conditions encompass factors such as high temperatures, heavy rainfall, and/or excessive growth.

The solutions and methods disclosed herein may be utilized to create an exogenous flexible film 50 that covers cuticle 10 and protects the cuticle. Exogenous flexible film 50 also may be referred to herein as a film 50 and may be successful in both preserving the plant's natural methods of protection from stressful conditions and providing additional protection for the plant. The solutions and methods disclosed herein have a variety of components and methods that accomplish these benefits. These may include one or more of a hydrophobic barrier component 52, a film forming matrix component 54, a plasticizing component 56, a preservative component 58, a complexing and crosslinking component 60, an ultraviolet light (UV) protectant component 62, and/or a film enhancing component 64, each of which is discussed in more detail herein. Additional examples of the above components and/or of combinations thereof that may be utilized to form and/or define films that may be utilized to protect plants are disclosed in U.S. Pat. No. 8,752,328, the complete disclosure of which is hereby incorporated by reference.

Hydrophobic barrier component 52 may be defined as any molecule that may inhibit moisture from crossing film 50. Examples of active ingredients that are attributed to this characteristic are palm oil and lecithin.

Palm oil is composed of a variety of fatty acids (C14, C16, and C18) that are 50% saturated and 50% unsaturated. These fatty acids, when present in film 50, may form a lipid monolayer that replicates the hydrophobic layer in the natural cuticular waxes. When applied to the fruit, it may form a bilayer with the existing cuticle (exhibiting Van der Waals forces) and/or may thicken the existing cuticle.

Lecithin behaves similarly to palm oil in the film, as it is made up of unsaturated fatty acids, yet it also may have a significant impact on the appearance of film 50 and/or of solutions that may be utilized to form and/or define film 50. Lecithin is commonly used in household products as an emulsifying/stabilizing agent because it forms lipid bilayers and liposomes when surrounded by water. This property allows the solutions disclosed herein to become easily dispersed in solution when diluted in a solvent, such as water.

A benefit that hydrophobic barrier components 52 in film 50 provide to the existing cuticle is that they may decrease conductance ($P_c$, as discussed herein with reference to equation (1)), or an overall, or effective, conductance ($P_c$) of the film-coated cuticle, thereby further decreasing water permeability of the cuticle. Both palm oil and lecithin are rich in alkanes, which decreases a potential for water diffusion across film 50.

Additional examples of hydrophobic barrier component 52 include hydrogenated palm oil, stearic acid, carnauba wax, glyceryl monostearate, monostearin, diglycerin stearate, stearin, lanolin, acetylated lanolin, tristearin, glycerides, monoglycerides, diglycerides, triglycerides, butyl stearate, stearyl alcohol, cetyl alcohol, cetostearyl alcohol, palmitic acid, oleic acid, poly(oxyethylenes), p-nonylphenols, polysorbates, alkylethoxylates, alkylphenoxyethoxylates, dioctyl sodium, sulfosuccinate, alkyl sulfonates, pinene homopolymer, fatty acids, metal salts of fatty acids, sodium salts of fatty acids, potassium salts of fatty acids, zinc salts of fatty acids, calcium salts of fatty acids, polyglycerine mono fatty acid esters, polyglycerine di fatty acid esters, polyglycerine tri fatty acid esters, polyglycerine mono fatty acid ethers, polyglycerine di fatty acid ethers, polyglycerine tri fatty acid ethers, lignin, lignosulfonic acid, lignosulfonic acid metal salts, beeswax, candelilla wax, ozokerite wax, shea butter, hard butter, palm kernel oil, avocado oil, tallow, lard, coconut oil, hydrogenated vegetable oil, octyl dodecanol, oleyl alcohol, algae oil, hemp oil, poppy seed oil, and/or soya lecithin.

Film forming matrix component 54 may be described as any molecule that may be used to allow film 50 to form a matrix structure and/or that forms the matrix structure within the film. An example of a component of film 50 that possesses this nature is carboxymethylcellulose (CMC).

Film forming matrix component 54 may be referred to herein as the bed, the matrix, and/or the superstructure of film 50 within which other components of film 50 may be entrapped and/or retained when film 50 surrounds and/or encapsulates the plant. This permits film 50 to mimic the natural cuticle of the plant. On the plant, a cellulose matrix is present as the cell wall, where it creates the bed for the existing cuticle layers. By providing an additional film-forming matrix component 54, film 50 contributes an additional, or a superficial, "cuticle" layer to the plant. The presence of the film forming matrix component also plays a role in the aesthetics of film 50, primarily its thickness. When film forming matrix component 54 includes CMC, and when CMC is combined with water, the carboxymethyl groups may react with the hydroxyl groups to form a cellulose backbone.

Additional examples of film forming matrix component 54 include cellulose acetate, hydroxyl ethyl cellulose, hydroxyl propyl cellulose, chitosan, ethylcellulose, butylcellulose, alkylcelluloses, phthalate esters of cellulose, acetate esters of cellulose, hypromellose, propylcellulose, cellulose acetate succinate, hypromellose acetate succinate, carboxyethylcellulose, cellulose acetate phthalate, cellulose, hypromellose phthalate, polyvinylacetate phthalate, xanthan gum, pectin, guar gum, locust bean gum, gellan gum, gum Arabic, carrageenan, alginic acid, salts of alginic acid, acacia, tragacanth, polyvinyl acetate, polyvinyl alcohol, polyvinyl pyrrolidone, methacrylic-acrylic acid copolymer, methacrylic-acrylic acid copolymer alkyl esters, methacrylic-acrylic acid copolymer ether, zein, hemicellulose, dextri maltose, dextrans, xylose, arabinoxylan, glucuronoxylan, glucomannan, xyloglucan, galactoglucomannan, arabinoglucoxylan, arabinogalactan, o-acetyl glactoglucomannan, amylopectin, rhamnoglacturonans, arabinnans, galactans, galacturonans, o-actyl-4-o-methylglucuronoxylopyranose, xylopranose, cornstarch, carboxymethyl cellulose ether, hyrdoxy propyl methyl cellulose, methyl cellulose, aluminum magnesium silicate, aluminum potassium silicate, bentonite, bentonite sodium, kaolin, montmorillonite, gum tragacanth, carob gum, dextrins, sodium alginate, citrus pectin, fructooligosaccharides, and/or gelatin.

Plasticizing component 56 of film 50, which also may be referred to herein as a plasticizer component 56, may include any molecule (or mixture of molecules) that may be used to facilitate formation of a firm phase but that also provides flexibility to the film. This may permit and/or facilitate expansion of film 50 as the fruit grows. Examples of plasticizing component 56 include glycerin, polysorbate 20, a plant extract, and/or *Yucca* extract. Glycerin is a thick liquid. It does not solidify when it freezes. Therefore, it also may be utilized as antifreeze in water. In film 50, glycerin may thicken the solution and prevent the film from becoming dry and/or brittle. Glycerin is hygroscopic, meaning that it will react with water in the atmosphere and/or absorb the water. This allows for flexibility in film 50 and may decrease transpiration from the plant by decreasing the difference in water concentrations across the membrane ($(C_i-C_o)$ in equation (1)). Glycerin's hygroscopic nature also prevents film 50 from fully drying out after application to the fruit.

Polysorbate 20 may act as an emulsifying component. Because of this, polysorbate 20 may play an important role in the solubility of the components of film 50 in water. It also may act as a surfactant, which may permit film 50 to spread across the surface of the plant by reducing an ionic surface charge of the plant.

Additional examples of plasticizing component 56 include propylene glycol, sorbitol, sorbitol solutions, sorbitan monostearate, sorbitan monooleate, lactamide, acetamide DEA, lactic acid, polysorbate 60, polysorbate 80, polyoxyethylene-fatty acid esters, triacetin, and/or dibutyl sebacate, polyglyceryl-fatty acids. Other examples of plasticizing component 56 include poly glycerol oleate, poly glyceryl 10 oleate, poly glyceryl 4 oleate, poly glyceryl 5 oleate, poly glyceryl 6 oleate, poly glyceryl 8 oleate, poly glyceryl stearate, poly glyceryl 6 stearate, poly glyceryl 2 stearate, poly glyceryl 4 stearate, lactic acid ethyl ester, lactic acid n-butyl ester, and/or honey.

Preservative component 58 of film 50 may include any molecule that may be utilized to increase the field and/or shelf life of a plant or plant part to which the film is applied. Examples of preservative component 58 include methyl parabens, propyl parabens, ethyl alcohol, isopropyl alcohol, proxel-type BIT biocides, and/or calcium propionate. Methyl and propyl parabens are both antifungals that may act to prolong both the storage of solutions utilized to form film 50 as well as the shelf life of plants, fruit, and/or nuts coated by film 50. Methyl and propyl parabens also mimic a natural plant pheromone and may deter insects. Calcium propionate may act as a mold inhibitor and/or as an antimicrobial. It also may perform several functions in solutions utilized to form film 50. First, calcium propionate is positively charged and may neutralize any negative ions remaining in the solutions from the CMC reactions. Second, calcium propionate may decrease the viscosity of the solution. It is believed to accomplish this function by disruption of long carbon chains with the addition of positive ions.

Additional examples of preservative component 58 include sodium acetate, acetic acid, calcium acetate, sodium benzoate, benzoic acid, potassium, sodium sorbate, potassium sorbate, sorbic acid, vanillin, ethylvanillin, propanoic acid, sodium propanoic acid salt, calcium propanoic acid salt, ascorbyl palmitate, methyl-p-hydroxy-benzoate, methyl parabens sodium salt, propyl-p-hydroxy benzoate, propyl parabens sodium salt, butanol, ethanol, phenol, propyl gallate, benzyl alcohol, phenoxy ethanol, ethyl-p-hydroxybenzoate, butyl-p-hydroxybenzoate, phenoxy ethanol, ethyl propionate, ethyl butyrate, p-chloro-m-xylenol, vitamin E, α-tocopherol, butylated hydroxyl-anisole (BHA), butylated hydroxyl-toluene (BHT), imidazolidinyl urea, diazolidinyl urea, sodium salts of ethylenediamine-tetraacetate, potassium salts of ethylenediamine-tetraacetate, 1,2-benzisothiazolin-3-one, cetyl pyridinium chloride, phenethyl alcohol, potassium lactate, sodium lactate, quaterium 14, quaterium 15, quaterium 24, benzalkonium chloride, benzathonium chloride, dilauryl thiodipropionate, dicetyl thiodipropionate, distearyl thiodipropionate, dimyristyl thiodipropionate, ditridecyle thiodipropionate, phosphatidylcholine, diisopropyl cresol, chlorobutanol, myristalkonium chloride, stearalkonium, tea tree oil, thyme oil, chloroxylenol, isopropanol, benzoic acid ammonium salt, benzoic acid calcium salt, benzoic acid magnesium salt, benzoic acid potassium salt, benzoic acid sodium salt, and/or potassium acetate.

Antioxidants also may be included in and/or may function as preservative component 58, and may increase field life of the plant or plant part, and/or may increase shelf life of the plant or plant part. Examples of antioxidants include n-acetyl cysteine, cysteine, salts of cysteine, sodium salts of cysteine, potassium salts of cysteine, calcium salts of cysteine, ethyl gallate, propyl gallate, cetyl gallate, dodecyl gallate, ascorbic acid, sodium salts of ascorbic acid, potassium salts of ascorbic acid, calcium salts of ascorbic acid, ascorbyl palmitate, and/or ethyl maltol.

Complexing and crosslinking component 60 may include any component that may form a matrix, within film 50, that stretches and/or adds strength to the film. Examples of complexing and crosslinking component 60 include calcium acetate, calcium chloride, zinc chloride, magnesium chloride, ferric chloride, acetic acid, salts of acetic acid, magnesium salts of acetic acid, manganese salts of acetic acid, and/or zinc salts of acetic acid.

UV protectant component 62 may include any molecule that may impart a UV protection quality to film 50. Examples of UV protectant component 62 include talc, mica, quartz, kaolin, bentonite, attapulgite, montmorillonite, smectic clay, silica, cinnamaldehyde, cinnamic acid, methylcinnamate, benzyl cinnamate, octylmethoxy-cinnamate, zinc oxide, titanium oxide, cinnamic alcohol, menthyl anthranilate, ethyl anthranilate, ethyl p-aminobenzoate, homomenthyl salicylate, benzyl salicylate, 2-ethylhexyl salicylate, isoamyl salicylate, methyl salicylate, syctonemin, agave wax, and/or hippo sweat.

Film enhancing component 64 may be defined as molecules that may be utilized to enhance film spreading and/or to increase stability of solutions that may be utilized to form and/or define films 50. Examples of film enhancing component 64 include surfactants, silicates, such as calcium silicate, potassium silicate, and/or magnesium silicate, isopropyl myristate, a silicone surfactant, SilWet 636™, an organosilicone surfactant, and/or Widespread™.

Isopropyl myristate (IPM) is commonly used in flea, tick, and lice products due to its ability to dissolve the waxy coating of the exoskeleton on the insect, thus killing the insect by dehydration. This suggests that IPM may act as a pest control component when incorporated into film 50. IPM also possesses reflective properties, which may provide additional UV protection by increasing reflection of UV radiation by film 50.

Increased yields that have been observed in field trials may be attributed to the presence of silicates in film 50. Potassium silicate, for example, may be readily absorbed by plants due to the presence of potassium, but the yield benefits may be attributed to the silicate. The uptake of silicate by the plant results in decreased environmental stresses by assisting the plant's ability to protect itself. Silicates may drive the formation of phytoliths, rigid plant tissues, that may become impregnated in the epidermal cell wall, creating a thicker barrier for pests/pathogens to penetrate, improving strength of the plant, and/or increasing area available for light penetration. The improved cellular walls also make the plant more resistant to changes in temperature, preventing the plant's tendency to change its metabolic rates based on transpiration related stresses. With decreased stress and stronger leaves and stems, potassium silicate has been directly credited with an increased Calvin cycle (increased chlorophyll and carboxylase production), a balanced distribution of nutrient uptake (fewer and/or no deficiencies/excesses), and/or an increase in the readiness for ammonium uptake. Result of all of these benefits may include increased reproductive rates of the plant and/or increased yields by the plant.

Additional examples of film enhancing component 64 include aluminum magnesium silicate, aluminum calcium silicate, aluminum sodium silicate, aluminum potassium silicate, aluminum sodium potassium silicate, magnesium trisilicate, dimethicone copolyol, dimethicone copolyol fatty acid esters, dimethicone copolyol fatty acid ethers, silicone glycol copolymer, isopropyl palmitate, isopropyl stearate, butyl stearate, diisopropyladipate, diacetyl adipate, dibutyl adipate, dioctyl adipate, glyceryl adipate, myristylmyristate, myristyl alcohol, oleic acid, soybean oil, vegetable oils, plant oils, ethyl oleate, lignin sulfate, salt of glycyrrhizinate, salts of myreth sulfate, castor oil dibehenate, ceteareth 15, ceteth 10, cetyl myristate, coc oleic DEA, diisotriacetyl adipate, hydrogenated menhaden acid, hydrogenated tallowoyl glutamic acid, isooctyl caprylate, isooctyl oleate, isooctyl stearate, isotricetyl stearate, lapyrium chloride, polyglyceryl oleate, polyglyceryl laurate, polyglyceryl stearate, polyglyceryl palmitate, lauryl glycoside, octyl glucoside, decyl glucoside, polysiloxy indolyl pyrrolidone phospholipid, isostearyl hydrolyzed collagen, almond oil, canola oil, castor oil, hydrogenated castor oil, corn oil, cottonseed oil, linseed oil, wheat oil, olive oil, peanut oil, rice bran oil, safflower oil, sesame oil, white mineral oil, wheat germ oil, rhamnolipids, mono rhamnolipids, and/or di rhamnolipids.

As discussed herein, film 50 may be formed by applying a solution to the plant. The solution may include a solvent, as well as hydrophobic barrier component 52, film forming matrix component 54, plasticizing component 56, preservative component 58, complexing and crosslinking component 60, UV protectant component 62, and/or film enhancing component 64. Examples of the solvent include water and/or deionized (DI) water.

The solvent may define any suitable portion, fraction, and/or weight percent of the solution. As examples, the solution may include, consist of, and/or consist essentially of at least 10 weight percent (wt %), at least 12 wt %, at least 14 wt %, at least 16 wt %, at least 18 wt %, at least 20 wt %, at least 22 wt %, at least 24 wt %, at least 26 wt %, at least 28 wt %, at least 30 wt %, at least 32 wt %, at least 34 wt %, at least 36 wt %, at least 38 wt %, at least 40 wt %, at least 42 wt %, at least 44 wt %, at least 46 wt %, at least 48 wt %, at least 50 wt %, at least 52 wt %, at least 54 wt %, at least 56 wt %, at least 58 wt %, at least 60 wt %, at least 62 wt %, at least 64 wt %, at least 66 wt %, at least 68 wt %, and/or at least 70 wt % of the solvent. Additionally or alternatively, the solution may include, consist of, and/or consist essentially of at most 82 wt %, at most 80 wt %, at most 78 wt %, at most 76 wt %, at most 74 wt %, at most 72 wt %, at most 70 wt %, at most 68 wt %, at most 66 wt %, at most 64 wt %, at most 62 wt %, at most 60 wt %, at most 58 wt %, at most 56 wt %, at most 54 wt %, at most 52 wt %, at most 50 wt %, at most 48 wt %, at most 46 wt %, at most 44 wt %, at most 42 wt %, at most 40 wt %, at most 38 wt %, at most 36 wt %, at most 34 wt %, at most 32 wt %, at most 30 wt %, at most 28 wt %, at most 26 wt %, at most 24 wt %, at most 22 wt %, and/or at most 20 wt % of the solvent.

The hydrophobic barrier component may form and/or define any suitable portion, fraction, and/or weight percent of the solution. As examples, the solution may include, consist of, and/or consist essentially of at least 1 wt %, at least 2 wt %, at least 3 wt %, at least 4 wt %, at least 5 wt %, at least 6 wt %, at least 8 wt %, at least 10 wt %, at least 12 wt %, at least 14 wt %, at least 16 wt %, at least 18 wt %, at least 20 wt % at least 25 wt %, at least 30 wt %, at least 35 wt %, and/or at least 40 wt % of the hydrophobic barrier component. Additionally or alternatively, the solution may include, consist of, and/or consist essentially of at most 50 wt %, at most 45 wt %, at most 40 wt %, at most 35 wt %, at most 30 wt %, at most 25 wt %, at most 24 wt %, at most 22 wt %, at most 20 wt %, at most 18 wt %, at most 16 wt %, at most 14 wt %, at most 12 wt %, at most 10 wt %, at most 8 wt %, at most 6 wt %, at most 4 wt %, and/or at most 2 wt % of the hydrophobic barrier component.

The solution also may include and/or be a mixture of hydrophobic barrier components, such as those that are disclosed herein. Under these conditions, the mixture of hydrophobic barrier components may include any suitable fraction of individual components included therein. Examples of the fraction of individual components include fractions of at least 1 wt %, at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, and/or at least 99 wt % of the hydrophobic barrier component of the solution. Additionally or alternatively, the fraction of individual components may be at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, and/or at most 1 wt % of the hydrophobic barrier component of the solution.

The film forming matrix component may form and/or define any suitable portion, fraction, and/or weight percent of the solution. As examples, the solution may include, consist of, and/or consist essentially of at least 0.05 wt %, at least 0.1 wt %, at least 0.15 wt %, at least 0.2 wt %, at least 0.25 wt %, at least 0.3 wt %, at least 0.4 wt %, at least 0.5 wt %, at least 0.6 wt %, at least 0.7 wt %, at least 0.8 wt %, at least 0.9 wt %, at least 1.0 wt %, at least 1.2 wt %, at least 1.4 wt %, at least 1.6 wt %, at least 1.8 wt %, at least 2.0 wt %, at least 2.2 wt %, at least 2.4 wt %, at least 2.6 wt %, at least 2.8 wt %, at least 3.0 wt %, at least 3.5 wt %, at least 4.0 wt %, at least 4.5 wt %, at least 5.0 wt %, at least 5.5 wt %, at least 6.0 wt %, at least 6.5 wt %, at least 7.0 wt %, at least 7.5 wt %, at least 8.0 wt %, at least 8.5 wt %, at least 9.0 wt %, at least 10 wt %, at least 15 wt %, and/or at least 20 wt % of the film forming matrix component. Additionally or alternatively, the solution may include, consist of, and/or consist essentially of at most 30 wt %, at most 25 wt %, at most 20 wt %, at most 15 wt %, at most 10.0 wt %, at most 9.5 wt %, at most 9.0 wt %, at most 8.5 wt %, at most 8.0 wt %, at most 7.5 wt %, at most 7.0 wt %, at most 6.5 wt %, at most 6.0 wt %, at most 5.5 wt %, at most 5.0 wt %, at most 4.5 wt %, at most 4.0 wt %, at most 3.5 wt %, at most 3.0 wt %, at most 2.8 wt %, at most 2.6 wt %, at most 2.4 wt %, at most 2.2 wt %, at most 2.0 wt %, at most 1.8 wt %, at most 1.6 wt %, at most 1.4 wt %, at most 1.2 wt %, at most 1.0 wt %, at most 0.8 wt %, at most 0.6 wt %, at most 0.4 wt %, at most 0.2 wt %, and/or at most 0.1 wt % of the film forming matrix component.

The solution also may include and/or be a mixture of film forming matrix components, such as those that are disclosed herein. Under these conditions, the mixture of film forming matrix components may include any suitable fraction of individual components included therein. Examples of the fraction of individual components include fractions of at least 1 wt %, at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, and/or at least 99 wt % of the film forming matrix component of the solution. Additionally or alternatively, the fraction of individual components may be at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, and/or at most 1 wt % of the film forming matrix component of the solution.

The plasticizing component may form and/or define any suitable portion, fraction, and/or weight percent of the solution. As examples, the solution may include, consist of, and/or consist essentially of at least 0.5 wt %, at least 1 wt %, at least 2 wt %, at least 4 wt %, at least 6 wt %, at least 8 wt %, at least 10 wt %, at least 12 wt %, at least 14 wt %, at least 16 wt %, at least 18 wt %, at least 20 wt %, at least 22 wt %, at least 24 wt %, at least 26 wt %, at least 28 wt %, and/or at least 30 wt % of the plasticizing component. Additionally or alternatively, the solution may include, consist of, and/or consist essentially of at most 40 wt %, at most 35 wt %, at most 30 wt %, at most 25 wt %, at most 20 wt %, at most 15 wt %, at most 10 wt %, at most 8 wt %, at most 6 wt %, at most 4 wt %, at most 2 wt %, and/or at most 1 wt % of the plasticizing component.

The solution also may include and/or be a mixture of plasticizing components, such as those that are disclosed herein. Under these conditions, the mixture of plasticizing components may include any suitable fraction of individual components included therein. Examples of the fraction of individual components include fractions of at least 1 wt %, at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, and/or at least 99 wt % of the plasticizing component of the solution. Additionally or alternatively, the fraction of individual components may be at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, and/or at most 1 wt % of the plasticizing component of the solution.

The preservative component may form and/or define any suitable portion, fraction, and/or weight percent of the solution. As examples, the solution may include, consist of, and/or consist essentially of at least 0.001 wt %, at least 0.005 wt %, at least 0.01 wt %, at least 0.05 wt %, at least 0.1 wt %, at least 0.2 wt %, at least 0.4 wt %, at least 0.8 wt %, at least 1 wt %, at least 1.5 wt %, at least 2 wt %, at least 2.5 wt %, at least 3 wt %, at least 4 wt %, at least 5 wt %, at least 6 wt %, at least 7 wt %, and/or at least 8 wt % of the preservative component. Additionally or alternatively, the solution may include, consist of, and/or consist essentially of at most 12 wt %, at most 10 wt %, at most 8 wt %, at most 6 wt %, at most 5 wt %, at most 4 wt %, at most 3 wt %, at most 2 wt %, at most 1 wt %, at most 0.8 wt %, at most 0.6 wt %, at most 0.4 wt %, and/or at most 0.2 wt % of the preservative component.

The solution also may include and/or be a mixture of preservative components, such as those that are disclosed herein. Under these conditions, the mixture of preservative components may include any suitable fraction of individual components included therein. Examples of the fraction of individual components include fractions of at least 1 wt %, at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, and/or at least 99 wt % of the preservative component of the solution. Additionally or alternatively, the fraction of individual components may be at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, and/or at most 1 wt % of the preservative component of the solution.

The complexing and crosslinking component may form and/or define any suitable portion, fraction, and/or weight percent of the solution. As examples, the solution may include, consist of, and/or consist essentially of at least 0.05 wt %, at least 0.1 wt %, at least 0.2 wt %, at least 0.3 wt %, at least 0.4 wt %, at least 0.5 wt %, at least 0.6 wt %, at least 0.8 wt %, at least 1 wt %, at least 2 wt %, at least 4 wt %, at least 6 wt %, and/or at least 8 wt % of the complexing and crosslinking component. Additionally or alternatively, the solution may include, consist of, and/or consist essentially of at most 10 wt %, at most 8 wt %, at most 6 wt %, at most 4 wt %, at most 3 wt %, at most 2 wt %, at most 1 wt %, at most 0.8 wt %, at most 0.6 wt %, at most 0.4 wt %, and/or at most 0.2 wt % of the complexing and crosslinking component.

The solution also may include and/or be a mixture of complexing and crosslinking components, such as those that are disclosed herein. Under these conditions, the mixture of complexing and crosslinking components may include any suitable fraction of individual components included therein. Examples of the fraction of individual components include fractions of at least 1 wt %, at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, and/or at least 99 wt % of the complexing and crosslinking component of the solution. Additionally or alternatively, the fraction of individual components may be at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, and/or at most 1 wt % of the complexing and crosslinking component of the solution.

The UV protectant component may form and/or define any suitable portion, fraction, and/or weight percent of the solution. As examples, the solution may include, consist of, and/or consist essentially of at least 0.001 wt %, at least 0.005 wt %, at least 0.01 wt %, at least 0.05 wt %, at least 0.1 wt %, at least 0.2 wt %, at least 0.4 wt %, at least 0.8 wt %, at least 1 wt %, at least 1.5 wt %, at least 2 wt %, at least 2.5 wt %, at least 3 wt %, at least 4 wt %, at least 5 wt %, at least 6 wt %, at least 7 wt %, and/or at least 8 wt % of the UV protectant component. Additionally or alternatively, the solution may include, consist of, and/or consist essentially of at most 12 wt %, at most 10 wt %, at most 8 wt %, at most 6 wt %, at most 5 wt %, at most 4 wt %, at most 3 wt %, at most 2 wt %, at most 1 wt %, at most 0.8 wt %, at most 0.6 wt %, at most 0.4 wt %, and/or at most 0.2 wt % of the UV protectant component.

The solution also may include and/or be a mixture of UV protectant components, such as those that are disclosed herein. Under these conditions, the mixture of UV protectant components may include any suitable fraction of individual components included therein. Examples of the fraction of individual components include fractions of at least 1 wt %, at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, and/or at least 99 wt % of the UV protectant component of the solution. Additionally or alternatively, the fraction of individual components may be at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, and/or at most 1 wt % of the UV protectant component of the solution.

The film enhancing component may form and/or define any suitable portion, fraction, and/or weight percent of the solution. As examples, the solution may include, consist of, and/or consist essentially of at least 0.01 wt %, at least 0.05 wt %, at least 0.1 wt %, at least 0.15 wt %, at least 0.2 wt %, at least 0.25 wt %, at least 0.5 wt %, at least 1 wt %, at least 2 wt %, at least 4 wt %, at least 6 wt %, at least 8 wt %, at least 10 wt %, at least 12 wt %, at least 14 wt %, at least 16 wt %, at least 18 wt %, at least 20 wt %, at least 22 wt %, at least 24 wt %, at least 26 wt %, at least 28 wt %, and/or at least 30 wt % of the film enhancing component. Additionally or alternatively, the solution may include, consist of, and/or consist essentially of at most 40 wt %, at most 35 wt %, at most 30 wt %, at most 25 wt %, at most 20 wt %, at most 18 wt %, at most 16 wt %, at most 14 wt %, at most 12 wt %, at most 10 wt %, at most 8 wt %, at most 6 wt %, at most 4 wt %, and/or at most 2 wt % of the film enhancing component.

The solution also may include and/or be a mixture of film enhancing components, such as those that are disclosed herein. Under these conditions, the mixture of film enhancing components may include any suitable fraction of individual components included therein. Examples of the fraction of individual components include fractions of at least 1 wt %, at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, and/or at least 99 wt % of the film enhancing component of the solution. Additionally or alternatively, the fraction of individual components may be at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, and/or at most 1 wt % of the film enhancing component of the solution.

Methods of forming an exogenous flexible film, according to the present disclosure, may include spraying a solution on a plant and evaporating at least a fraction of a solvent from the solution to form and/or define the exogenous flexible film. Examples of the solution are disclosed herein. Examples of the exogenous flexible film are disclosed herein with reference to film 50 of FIG. 1. The solution may be a concentrated solution. Under these conditions, and prior to the spraying, the methods may include diluting the concentrated solution with solvent, or with additional solvent, to form and/or define a sprayed, or diluted, solution. The spraying then may include spraying the diluted solution.

As discussed, the plant may include fruit. Under these conditions, the spraying may include spraying at least a threshold number of days prior to harvesting of the fruit. Examples of the threshold number of days prior to harvesting of the fruit include at least 10, at least 15, at least 20, at least 25, at least 30, at least 35, at least 40, at least 45, at least 50, at least 55, at least 60, at least 65, at least 70, at least 75, at least 80, at least 85, or at least 90 days.

Additionally or alternatively, the spraying may include spraying within a threshold number of days of bud break, spraying at least a threshold number of days before bud break, spraying at most a threshold number of days after bud break, spraying within a threshold number of days of full bloom, spraying at least a threshold number of days before full bloom, spraying at most a threshold number of days after full bloom, spraying within a threshold number of days of fruit set, spraying at least a threshold number of days before fruit set, and/or spraying at most a threshold number of days after fruit set. Examples of the threshold number of days include 2 days, 4 days, 6 days, 8 days, 10 days, 12 days, 14 days, 16 days, 18 days, 20 days, 22 days, 24 days, 26 days, 28 days, and/or 30 days.

The methods also may be repeated. As an example, the methods may be repeated a plurality of different times, with each instance of the spraying being performed a different number of days prior to harvesting of the fruit.

The following are examples of solutions, according to the present disclosure, that may be utilized to form exogenous flexible films on plants and/or of the results of utilizing such films. These examples illustrate the benefits of the solutions and methods disclosed herein and/or specific solution compositions that may be utilized. The examples are in no way to be considered limiting to the present disclosure.

As discussed, the solutions and methods disclosed herein may be utilized to reduce the occurrence and/or severity of microfractures in the cuticle of fruits. The presence of microfractures often correlates with larger-scale fruit cracking and/or with the incidence of disease within the fruit. As such, the solutions and methods disclosed herein may be referred to as solutions and/or methods for decreasing cracking and/or for decreasing disease incidence in fruit.

In a first field test, a solution including approximately 13.3 wt % of a hydrophobic barrier component, 1 wt % of a film forming matrix component, 6.8 wt % of a plasticizing component, 0.44 wt % of a preservative component, 16.9 wt % of a film enhancing component, 60 wt % of a solvent, and 1 wt % of a complexing and crosslinking component was applied to fruit (Bing cherries). The fruit then was observed for microfractures at harvest.

Figure 2:
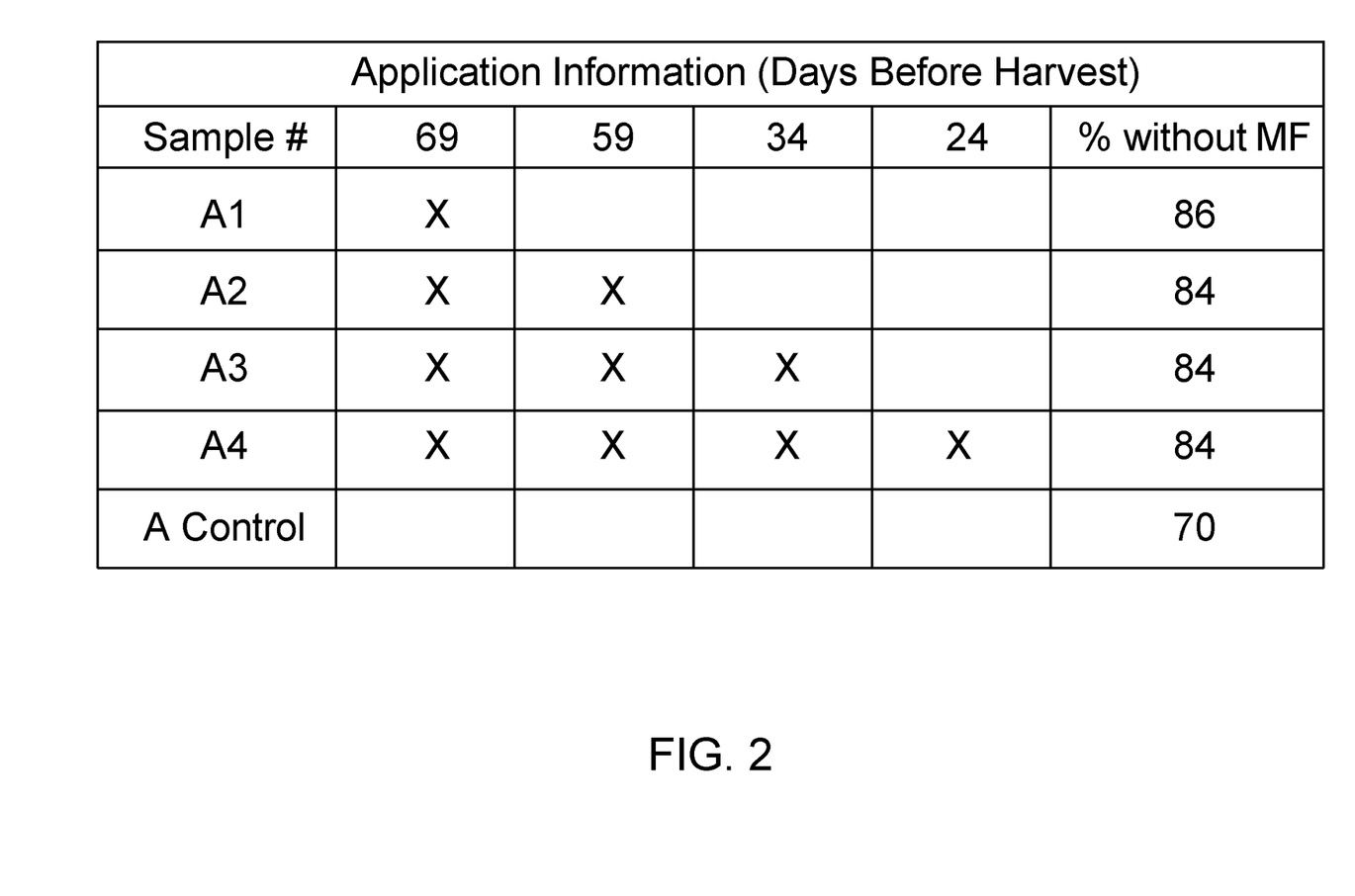
FIG. 2 is a table detailing microfracture formation for several different samples of a field trial.

The results of this field test are summarized in FIG. 2. More specifically, the solution was applied to a first test sample (i.e., Sample #A1) 25 days after full bloom (approximately 69 days prior to harvest). The solution was applied to a second test sample (i.e., Sample #A2) both 25 days after full bloom (69 days prior to harvest) and 35 days after full bloom (59 days prior to harvest). The solution was applied to a third test sample (i.e., Sample #A3) 25 days after full bloom (69 days prior to harvest), 35 days after full bloom (59 days prior to harvest), and at straw color (approximately 60 days after full bloom and 34 days prior to harvest). The solution was applied to a fourth test sample (i.e., Sample #A4) 25 days after full bloom (69 days prior to harvest), 35 days after full bloom (59 days prior to harvest), at straw color (34 days prior to harvest), and 10 days after straw color (24 days prior to harvest). A control sample (i.e., Sample #A Control) did not receive any application of the solution.

The samples then were observed for microfractures in the cuticle at harvest. The four test samples exhibited a 14%-16% decrease in the occurrence of microfractures (or increase in the number of fruit with no measurable microfractures) when compared to the control sample. More specifically, Sample #A1 contained 86% fruit with no measurable microfractures, Sample #A2 contained 84% fruit with no measurable microfractures, Sample #A3 contained 84% fruit with no measurable microfractures, Sample A4 contained 84% fruit with no measurable microfractures, and Sample #A Control contained only 70% fruit with no measurable microfractures.

The results indicate that the first application of the solution, at 25 days after full bloom (69 days prior to harvest), has the most significant impact on the observed decrease in microfractures at harvest. More specifically, samples that included additional, later solution applications exhibited little, if any, additional measurable decrease in the presence of microfractures at harvest.

Figure 3:
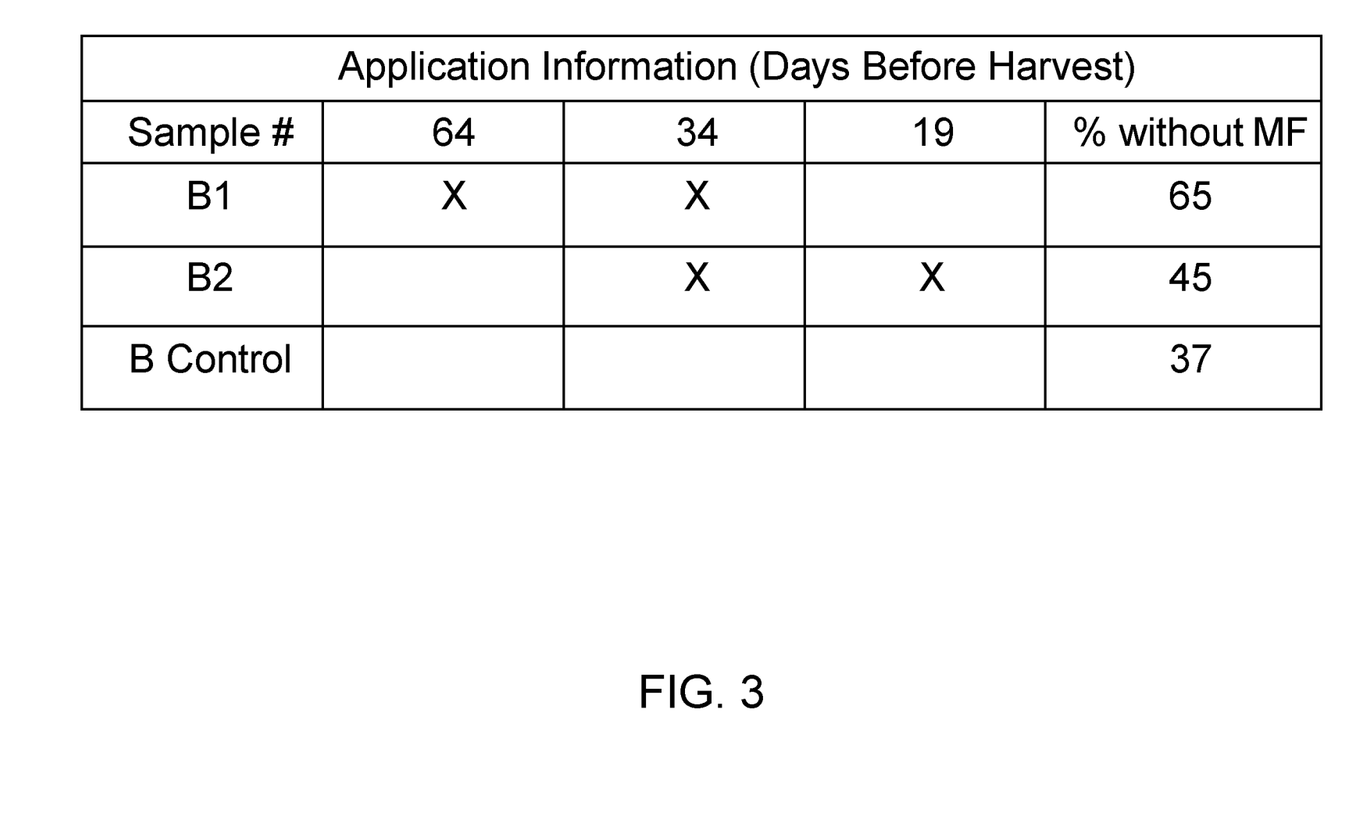
FIG. 3 is a table detailing microfracture formation for several different samples of another field trial.

In another field test, the solution was once again applied to fruit (Bing cherries) and the fruit then was observed for microfractures at harvest. The results of this field test are summarized in FIG. 3. More specifically, the solution was applied to a first test sample (i.e., Sample #B1) at 30 days after full bloom (approximately 64 days prior to harvest) and at straw color (approximately 34 days prior to harvest). The solution also was applied to a second test sample (i.e., Sample #B2) at straw color (34 days prior to harvest) and 15 days after straw color (approximately 19 days prior to harvest). A control sample (Sample #B Control) did not receive any application of the solution.

The samples were observed for microfractures at harvest. The early application test sample (Sample #B1) exhibited a 20% decrease in the occurrence of microfractures (or increase in the number of fruit with no measurable microfractures) when compared to the late application test sample (Sample #B2) and a 28% decrease in the occurrence of microfractures (or increase in the number of fruit with no measurable microfractures) when compared to the late application test sample. More specifically, Sample #B1 contained 65% fruit with no measurable microfractures, while Sample #B2 contained 45% fruit with no measurable microfractures. Sample #B Control contained 37% fruit with no measurable microfractures. Once again, the results indicate that earlier application (i.e., at 64 days prior to harvest) has the most significant impact on the observed decrease in microfractures at harvest.

As discussed herein, the cuticle is formed early in the life of the fruit and then stretches, expands, and/or thins as the fruit develops. It is postulated that early application of films 50 fortifies the cuticle during the early stages of fruit development, thereby decreasing a potential for microfracture formation during growth and providing a significant increase in fruit quality at harvest. This assertion is supported by FIG. 4, which illustrates the percent of fruit (Bing cherries) exhibiting microfractures as a function of time, during fruit development, for fruit that has not been treated with films 50.

Figure 4:
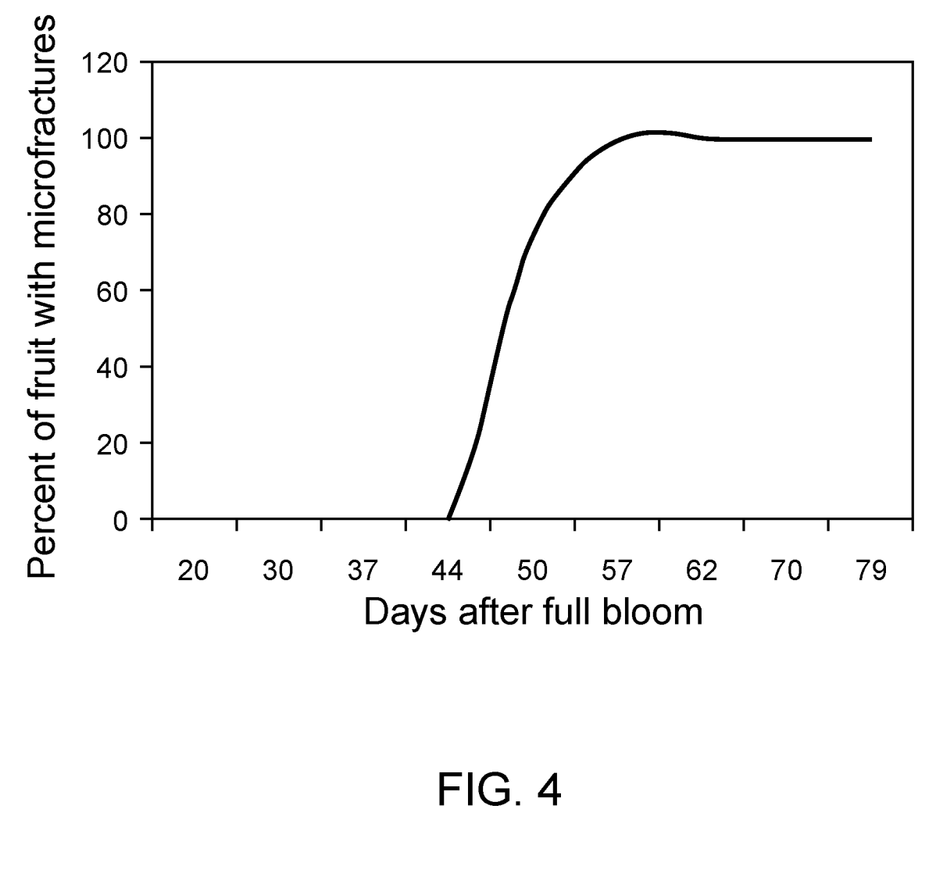
FIG. 4 is a graph depicting a percentage of fruit that includes microfractures as a function of time after full bloom for Bing cherries that have not been treated by the systems and/or methods according to the present disclosure.

As may be seen from FIG. 4, microfractures generally do not develop until approximately 44 days after full bloom and then increase substantially with time before plateauing. The onset of microfracture development may correlate to the onset of rapid growth of the fruit, which occurs in parallel with a significant decrease in cuticle development within the fruit. As such, during the rapid growth phase, the existing cuticle is stretched, which may lead to microfracture formation. Application of films 50 prior to this phase of fruit growth and/or prior to microfracture formation may strengthen the cuticle, thereby decreasing the potential for microfracture formation during the rapid growth phase.

In addition to the above-discussed reduction in microfractures, the solutions and methods disclosed herein may improve the quality and/or shelf life of fruits in other ways, such as during post-harvest storage. Coating of fruit with the solutions disclosed herein and/or with films 50 formed thereby may reduce the transpiration of oxygen through the cuticle. With a lower rate of oxygen entering through the cuticle there is less production of reactive oxygen species (ROS) within the fruit. This decreases oxygen's association with the oxygenase enzymes of the fruit because the fruit has less oxygen to react with in performing oxidative reactions. Less ROS in the fruit decreases the rate of degradation of substances in fruit that would cause a decline in the quality of the fruit over time. Thus, formation of films 50 may cause fruit to stay fresh for extended periods of time when compared to fruit that does not include films 50 formed thereon. It has been observed that spraying at a time later in the growing season does not necessarily reduce the overall amount of oxygen in the fruit so ROS level would not decline. On the other hand, spraying earlier, such as more than 40 days prior to harvest, decreases the amount of oxygen in the fruit and effects ROS production.

In addition to reducing ROS, the methods disclosed herein may lower an amount of oxygen present within the fruit during maturation of the fruit. This may decrease an amount of oxygen present within the fruit to react with and/or to degrade ethylene, which may make ethylene more available to produce improved fruit during the maturation of the fruit. Increased ethylene may be responsible for fruit being larger, for more solids and/or sugars being present within the fruit, for increased sweetness of taste of the fruit, etc. After harvest, the decrease in oxygen transpiration may cause a decrease in the production of ethylene, which decreases the degradation of the fruit. Thus, fruit coated with films 50 may remain in a better state after harvest when compared to fruit that is not coated with films 50. In one example, stored post-harvest fruit coated with films 50 exhibited a 15% decrease in disease occurrence. Decreases in ROS and the increased ethylene also may provide a slightly longer growing period that gives the fruit a better appearance.

Coating fruit with films 50 also results in improved ethylene "regulation". As fruit starts to ripen, and ethylene is given off, the pattern is generally erratic, meaning that the fruit exhibits peaks and valleys of ethylene release. This inconsistent release can lead to pre-harvest stress and can continue into post-harvest, reducing the shelf life of the fruit. Coating the fruit with film 50 makes ethylene release more consistent, thereby decreasing stress on the fruit and/or leading to a more consistent shelf life of the fruit.

Coating fruit with films 50 also may increase firmness of the cuticle. With the addition of film 50, the effective thickness of the cuticle is increased, which may provide better protection for the fruit and/or may reduce cracking of the fruit during rain events. Increasing the effective cuticle strength by the thickening of the cuticle also may provide better protection of the fruit from sunburn. In addition, increasing fruit cuticle strength may reduce fractures and/or microfractures in the cuticle, which may decrease a potential for disease to enter into the fruit.

Coating fruit with films 50 also may enhance photosynthetic activity when compared to non-coated fruit. Sunburn damage may be caused when photosynthetically active portions of the plant lose their efficiency in transforming solar energy into chemical energy due to a block in electron transport from the photosystem II complex (PS-II) to photosystem I (PS-I). During conditions of high solar radiation and/or high temperatures, the PS-II complex loses its energy transportation ability to PS-I and the excess of accumulated solar energy gives way to the formation of ROS within the plant. The ROS induces oxidative damage to the tissue, which is observed as sunburn. Parka applications have been observed to reduce sunburn incidence. It is postulated that this reduction is caused by increasing the photochemical efficiency (measured by chlorophyll fluorescence) of the PS-II complex and reducing the photo-inhibition process. In field trials, photochemical efficiency was increased approximately 10% to 30% when compared to control samples. This increase in photochemical activity may be a result of an increase in overall chlorophyll content and/or as an increase in pheophytin content within the plant.

As discussed, exogenous flexible films 50, which are disclosed herein, generally are formed by spraying a solution on a plant. The solution generally is an aqueous solution including a solvent, in the form of water, and several other components, examples of which are disclosed herein. In certain situations, it may be desirable to produce a concentrated, or a highly concentrated, solution, such as to decrease the costs associated with shipping water. An example of a concentrated solution, according to the present disclosure, includes 7 wt % preservative component, 25 wt % hydrophobic barrier component, 13 wt % plasticizing component, 33 wt % film enhancing component, 2 wt % film forming matrix component, and 20 wt % water. This solution is proven to be stable and readily diluted with additional water at the time of application.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Illustrative, non-exclusive examples of solutions and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

- A1. A solution formulated to be applied to a plant and to form an exogenous flexible film on the plant, the solution comprising, consisting of, or consisting essentially of:
  - (i) a solvent;
  - (ii) a film forming matrix component;
  - (iii) a hydrophobic barrier component;
  - (iv) a plasticizing component; and
  - (v) a film enhancing component.
- A2. The solution of paragraph A1, wherein the solvent includes, consists of, or consists essentially of at least one of water and deionized water.
- A3. The solution of any of paragraphs A1-A2, wherein the solution includes, consists of, or consists essentially of at least one of:
  - (i) at least 10 weight percent (wt %), at least 12 wt %, at least 14 wt %, at least 16 wt %, at least 18 wt %, at least 20 wt %, at least 22 wt %, at least 24 wt %, at least 26 wt %, at least 28 wt %, at least 30 wt %, at least 32 wt %, at least 34 wt %, at least 36 wt %, at least 38 wt %, at least 40 wt %, at least 42 wt %, at least 44 wt %, at least 46 wt %, at least 48 wt %, at least 50 wt %, at least 52 wt %, at least 54 wt %, at least 56 wt %, at least 58 wt %, at least 60 wt %, at least 62 wt %, at least 64 wt %, at least 66 wt %, at least 68 wt %, or at least 70 wt % of the solvent; and
  - (ii) at most 82 wt %, at most 80 wt %, at most 78 wt %, at most 76 wt %, at most 74 wt %, at most 72 wt %, at most 70 wt %, at most 68 wt %, at most 66 wt %, at most 64 wt %, at most 62 wt %, at most 60 wt %, at most 58 wt %, at most 56 wt %, at most 54 wt %, at most 52 wt %, at most 50 wt %, at most 48 wt %, at most 46 wt %, at most 44 wt %, at most 42 wt %, at most 40 wt %, at most 38 wt %, at most 36 wt %, at most 34 wt %, at most 32 wt %, at most 30 wt %, at most 28 wt %, at most 26 wt %, at most 24 wt %, at most 22 wt %, or at most 20 wt % of the solvent.
- A4. The solution of any of paragraphs A1-A3, wherein the film forming matrix component includes, consists of, or consists essentially of at least one of carboxymethylcellulose (CMC), cellulose acetate, hydroxyl ethyl cellulose, hydroxyl propyl cellulose, chitosan, ethylcellulose, butylcellulose, alkylcelluloses, phthalate esters of cellulose, acetate esters of cellulose, hypromellose, propylcellulose, cellulose acetate succinate, hypromellose acetate succinate, carboxyethylcellulose, cellulose acetate phthalate, cellulose, hypromellose phthalate, polyvinylacetate phthalate, xanthan gum, pectin, guar gum, locust bean gum, gellan gum, gum Arabic, carrageenan, alginic acid, salts of alginic acid, acacia, tragacanth, polyvinyl acetate, polyvinyl alcohol, polyvinyl pyrrolidone, methacrylic-acrylic acid copolymer, methacrylic-acrylic acid copolymer alkyl esters, methacrylic-acrylic acid copolymer ether, zein, hemicellulose, dextri maltose, dextrans, xylose, arabinoxylan, glucuronoxylan, glucomannan, xyloglucan, galactoglucomannan, arabinoglucoxylan, arabinogalactan, o-acetyl glactoglucomannan, amylopectin, rhamnoglacturonans, arabinnans, galactans, galacturonans, o-actyl-4-o-methylglucuronoxylopyranose, xylopranose, cornstarch, carboxymethyl cellulose ether, hyrdoxy propyl methyl cellulose, methyl cellulose, aluminum magnesium silicate, aluminum potassium silicate, bentonite, bentonite sodium, kaolin, montmorillonite, gum tragacanth, carob gum, dextrins, sodium alginate, citrus pectin, fructooligosaccharides, and/or gelatin.
- A5. The solution of any of paragraphs A1-A4, wherein the solution includes, consists of, or consists essentially of at least one of:
  - (i) at least 0.05 weight percent (wt %), at least 0.1 wt %, at least 0.15 wt %, at least 0.2 wt %, at least 0.25 wt %, at least 0.3 wt %, at least 0.4 wt %, at least 0.5 wt %, at least 0.6 wt %, at least 0.7 wt %, at least 0.8 wt %, at least 0.9 wt %, at least 1.0 wt %, at least 1.2 wt %, at least 1.4 wt %, at least 1.6 wt %, at least 1.8 wt %, at least 2.0 wt %, at least 2.2 wt %, at least 2.4 wt %, at least 2.6 wt %, at least 2.8 wt %, at least 3.0 wt %, at least 3.5 wt %, at least 4.0 wt %, at least 4.5 wt %, at least 5.0 wt %, at least 5.5 wt %, at least 6.0 wt %, at least 6.5 wt %, at least 7.0 wt %, at least 7.5 wt %, at least 8.0 wt %, at least 8.5 wt %, at least 9.0 wt %, at least 10 wt %, at least 15 wt %, or at least 20 wt % of the film forming matrix component; and
  - (ii) at most 30 wt %, at most 25 wt %, at most 20 wt %, at most 15 wt %, at most 10.0 wt %, at most 9.5 wt %, at most 9.0 wt %, at most 8.5 wt %, at most 8.0 wt %, at most 7.5 wt %, at most 7.0 wt %, at most 6.5 wt %, at most 6.0 wt %, at most 5.5 wt %, at most 5.0 wt %, at most 4.5 wt %, at most 4.0 wt %, at most 3.5 wt %, at most 3.0 wt %, at most 2.8 wt %, at most 2.6 wt %, at most 2.4 wt %, at most 2.2 wt %, at most 2.0 wt %, at most 1.8 wt %, at most 1.6 wt %, at most 1.4 wt %, at most 1.2 wt %, at most 1.0 wt %, at most 0.8 wt %, at most 0.6 wt %, at most 0.4 wt %, at most 0.2 wt %, or at most 0.1 wt % of the film forming matrix component.
- A6. The solution of any of paragraphs A1-A5, wherein the solution includes, consists of, or consists essentially of a mixture of film forming matrix components, and further wherein the mixture of film forming matrix components comprises at least one of:
  - (i) at least 1 weight percent (wt %), at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, or at least 99 wt % of each film forming matrix component in the mixture of film forming matrix components; and
  - (ii) at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, or at most 1 wt % of each film forming matrix component in the mixture of film forming matrix components.

A7. The solution of any of paragraphs A1-A6, wherein the hydrophobic barrier component includes, consists of, or consists essentially of at least one of palm oil, hydrogenated palm oil, lecithin, soya lecithin, stearic acid, carnauba wax, glyceryl monostearate, monostearin, diglycerin stearate, stearin, lanolin, acetylated lanolin, tristearin, glycerides, monoglycerides, diglycerides, triglycerides, butyl stearate, stearyl alcohol, cetyl alcohol, cetostearyl alcohol, palmitic acid, oleic acid, poly(oxyethylenes), p-nonylphenols, polysorbates, alkylethoxylates, alkylphenoxyethoxylates, dioctyl sodium, sulfosuccinate, alkyl sulfonates, pinene homopolymer, fatty acids, metal salts of fatty acids, sodium salts of fatty acids, potassium salts of fatty acids, zinc salts of fatty acids, calcium salts of fatty acids, polyglycerine mono fatty acid esters, polyglycerine di fatty acid esters, polyglycerine tri fatty acid esters, polyglycerine mono fatty acid ethers, polyglycerine di fatty acid ethers, polyglycerine tri fatty acid ethers, lignin, lignosulfonic acid, lignosulfonic acid metal salts, beeswax, candelilla wax, ozokerite wax, shea butter, hard butter, palm kernel oil, avocado oil, tallow, lard, coconut oil, hydrogenated vegetable oil, octyl dodecanol, oleyl alcohol, algae oil, hemp oil, and poppy seed oil.

A8. The solution of any of paragraphs A1-A7, wherein the solution includes, consists of, or consists essentially of at least one of:
(i) at least 1 weight percent (wt %), at least 2 wt %, at least 3 wt %, at least 4 wt %, at least 5 wt %, at least 6 wt %, at least 8 wt %, at least 10 wt %, at least 12 wt %, at least 14 wt %, at least 16 wt %, at least 18 wt %, at least 20 wt % at least 25 wt %, at least 30 wt %, at least 35 wt %, or at least 40 wt % of the hydrophobic barrier component; and
(ii) at most 50 wt %, at most 45 wt %, at most 40 wt %, at most 35 wt %, at most 30 wt %, at most 25 wt %, at most 24 wt %, at most 22 wt %, at most 20 wt %, at most 18 wt %, at most 16 wt %, at most 14 wt %, at most 12 wt %, at most 10 wt %, at most 8 wt %, at most 6 wt %, at most 4 wt %, or at most 2 wt % of the hydrophobic barrier component.

A9. The solution of any of paragraphs A1-A8, wherein the solution includes, consists of, or consists essentially of a mixture of hydrophobic barrier components, and further wherein the mixture of hydrophobic barrier components comprises at least one of:
(i) at least 1 weight percent (wt %), at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, or at least 99 wt % of each hydrophobic barrier component in the mixture of hydrophobic barrier components; and
(ii) at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, or at most 1 wt % of each hydrophobic barrier component in the mixture of hydrophobic barrier components.

A10. The solution of any of paragraphs A1-A9, wherein the plasticizing component includes, consists of, or consists essentially of at least one of glycerin, polysorbate 20, a plant extract, yucca extract, propylene glycol, sorbitol, sorbitol solutions, sorbitan monostearate, sorbitan monooleate, lactamide, acetamide DEA, lactic acid, polysorbate 60, polysorbate 80, polyoxyethylene-fatty acid esters, triacetin, dibutyl sebacate, polyglyceryl-fatty acids, poly glycerol oleate, poly glyceryl 10 oleate, poly glyceryl 4 oleate, poly glyceryl 5 oleate, poly glyceryl 6 oleate, poly glyceryl 8 oleate, poly glyceryl stearate, poly glyceryl 6 stearate, poly glyceryl 2 stearate, poly glyceryl 4 stearate, lactic acid ethyl ester, lactic acid n-butyl ester, and honey.

A11. The solution of any of paragraphs A1-A10, wherein the plasticizing component includes, consists of, or consists essentially of at least one of a plant extract and a Yucca extract.

A12. The solution of any of paragraphs A1-A11, wherein the solution includes, consists of, or consists essentially of at least one of:
(i) at least 0.5 weight percent (wt %), at least 1 wt %, at least 2 wt %, at least 4 wt %, at least 6 wt %, at least 8 wt %, at least 10 wt %, at least 12 wt %, at least 14 wt %, at least 16 wt %, at least 18 wt %, at least 20 wt %, at least 22 wt %, at least 24 wt %, at least 26 wt %, at least 28 wt %, or at least 30 wt % of the plasticizing component; and
(ii) at most 40 wt %, at most 35 wt %, at most 30 wt %, at most 25 wt %, at most 20 wt %, at most 15 wt %, at most 10 wt %, at most 8 wt %, at most 6 wt %, at most 4 wt %, at most 2 wt %, or at most 1 wt % of the plasticizing component.

A13. The solution of any of paragraphs A1-A12, wherein the solution includes, consists of, or consists essentially of a mixture of plasticizing components, and further wherein the mixture of plasticizing components comprises at least one of:
(i) at least 1 weight percent (wt %), at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, or at least 99 wt % of each plasticizing component in the mixture of plasticizing components; and
(ii) at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, or at most 1 wt % of each plasticizing component in the mixture of plasticizing components.

A14. The solution of any of paragraphs A1-A13, wherein the film enhancing component includes, consists of, or consists essentially of at least one of aluminum magnesium silicate, aluminum calcium silicate, magnesium silicate, aluminum sodium silicate, aluminum potassium silicate, aluminum sodium potassium silicate, magnesium trisilicate, dimethicone copolyol, dimethicone copolyol fatty acid esters, dimethicone copolyol fatty acid ethers, silicone glycol copolymer, isopropyl palmitate, isopropyl stearate, butyl stearate, diisopropyladipate, diacetyl adipate, dibutyl adipate, dioctyl adipate, glyceryl adipate, myristylmyristate, myristyl alcohol, oleic acid, soybean oil, vegetable oils, plant oils, ethyl oleate, lignin sulfate, salt of glycyrrhizinate, salts of myreth sulfate, castor oil dibehenate, ceteareth 15, ceteth 10, cetyl myristate, coc oleic DEA, diisotriacetyl adipate, hydrogenated menhaden acid, hydrogenated tallowoyl glutamic acid, isooctyl caprylate, isooctyl oleate, isooctyl stearate, isotricetyl stearate, lapyrium chloride, polyglyceryl oleate, polyglyceryl laurate, polyglyceryl stearate, polyglyceryl palmitate, lauryl glycoside, octyl glucoside, decyl glucoside, polysiloxy indolyl pyrrolidone phospholipid, isostearyl hydrolyzed collagen, almond oil, canola oil, castor oil, hydrogenated castor oil, corn oil, cottonseed oil, linseed oil, wheat oil, olive oil, peanut oil, rice bran oil, safflower oil, sesame oil, white mineral oil, wheat germ oil, rhamnolipids, mono rhamnolipids, and di rhamnolipids.

A15. The solution of any of paragraphs A1-A14, wherein the film enhancing component includes, consists of, or consists essentially of at least one of a silicate, calcium silicate, potassium silicate, magnesium silicate, isopropyl myristate, a silicone surfactant, SilWet 636™, an organosilicone surfactant, and Widespread™.

A16. The solution of any of paragraphs A1-A15, wherein the solution includes, consists of, or consists essentially of at least one of:
(i) at least 0.01 weight percent (wt %), at least 0.05 wt %, at least 0.1 wt %, at least 0.15 wt %, at least 0.2 wt %, at least 0.25 wt %, at least 0.5 wt %, at least 1 wt %, at least 2 wt %, at least 4 wt %, at least 6 wt %, at least 8 wt %, at least 10 wt %, at least 12 wt %, at least 14 wt %, at least 16 wt %, at least 18 wt %, at least 20 wt %, at least 22 wt %, at least 24 wt %, at least 26 wt %, at least 28 wt %, or at least 30 wt % of the film enhancing component; and
(ii) at most 40 wt %, at most 35 wt %, at most 30 wt %, at most 25 wt %, at most 20 wt %, at most 18 wt %, at most 16 wt %, at most 14 wt %, at most 12 wt %, at most 10 wt %, at most 8 wt %, at most 6 wt %, at most 4 wt %, or at most 2 wt % of the film enhancing component.

A17. The solution of any of paragraphs A1-A16, wherein the solution includes, consists of, or consists essentially of a mixture of film enhancing components, and further wherein the mixture of film enhancing components comprises at least one of:
(i) at least 1 weight percent (wt %), at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, or at least 99 wt % of each film enhancing component in the mixture of film enhancing components; and
(ii) at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, or at most 1 wt % of each film enhancing component in the mixture of film enhancing components.

A18. The solution of any of paragraphs A1-A17, wherein the solution further includes a complexing and crosslinking component.

A19. The solution of paragraph A18, wherein the complexing and crosslinking component includes, consists of, or consists essentially of at least one of calcium acetate, calcium chloride, zinc chloride, magnesium chloride, ferric chloride, acetic acid, salts of acetic acid, magnesium salts of acetic acid, manganese salts of acetic acid, and zinc salts of acetic acid.

A20. The solution of any of paragraphs A18-A19, wherein the solution includes, consists of, or consist essentially of at least one of:
(i) at least 0.05 weight percent (wt %), at least 0.1 wt %, at least 0.2 wt %, at least 0.3 wt %, at least 0.4 wt %, at least 0.5 wt %, at least 0.6 wt %, at least 0.8 wt %, at least 1 wt %, at least 2 wt %, at least 4 wt %, at least 6 wt %, or at least 8 wt % of the complexing and crosslinking component; and
(ii) at most 10 wt %, at most 8 wt %, at most 6 wt %, at most 4 wt %, at most 3 wt %, at most 2 wt %, at most 1 wt %, at most 0.8 wt %, at most 0.6 wt %, at most 0.4 wt %, or at most 0.2 wt % of the complexing and crosslinking component.

A21. The solution of any of paragraphs A18-A20, wherein the solution includes, consists of, or consists essentially of a mixture of complexing and crosslinking components, and further wherein the mixture of complexing and crosslinking components comprises at least one of:
(i) at least 1 weight percent (wt %), at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, or at least 99 wt % of each complexing and crosslinking component in the mixture of complexing and crosslinking components; and
(ii) at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, or at most 1 wt % of each complexing and crosslinking component in the mixture of complexing and crosslinking components.

A22. The solution of any of paragraphs A1-A21, wherein the solution further includes, consists of, or consists essentially of a preservative component.

A23. The solution of paragraph A22, wherein the preservative component includes, consists of, or consists essentially of at least one of methyl parabens, propyl parabens, ethyl alcohol, isopropyl alcohol, proxel-type BIT biocides, calcium propionate, sodium acetate, acetic acid, calcium acetate, sodium benzoate, benzoic acid, potassium, sodium sorbate, potassium sorbate, sorbic acid, vanillin, ethylvanillin, propanoic acid, sodium propanoic acid salt, calcium propanoic acid salt, ascorbyl palmitate, methyl-p-hydroxy-benzoate, methyl parabens sodium salt, propyl-p-hydroxy benzoate, propyl parabens sodium salt, butanol, ethanol, phenol, propyl gallate, benzyl alcohol, phenoxy ethanol, ethyl-p-hydroxybenzoate, butyl-p-hydroxybenzoate, phenoxy ethanol, ethyl propionate, ethyl butyrate, p-chloro-m-xylenol, vitamin E, α-tocopherol, butylated hydroxyl-anisole (BHA), butylated hydroxyl-toluene (BHT), imidazolidinyl urea, diazolidinyl urea, sodium salts of ethylenediamine-tetraacetate, potassium salts of ethylenediamine-tetraacetate, 1,2-benzisothiazolin-3-one, cetyl pyridinium chloride, phenethyl alcohol, potassium lactate, sodium lactate, quaterium 14, quaterium 15, quaterium 24, benzalkonium chloride, benzathonium chloride, dilauryl thiodipropionate, dicetyl thiodipropionate, distearyl thiodipropionate, dimyristyl thiodipropionate, ditridecyle thiodipropionate, phosphatidylcholine, diisopropyl cresol, chlorobutanol, myristalkonium chloride, stearalkonium, tea tree oil, thyme oil, chloroxylenol, n-acetyl cysteine, cysteine, salts of cysteine, sodium salts of cysteine, potassium salts of cysteine, calcium salts of cysteine, ethyl gallate, propyl gallate, cetyl gallate, dodecyl gallate, ascorbic acid, sodium salts of ascorbic acid, potassium salts of ascorbic acid, calcium salts of ascorbic acid, ethyl maltol, ethanol, isopropanol, vanillin, benzoic acid ammonium salt, benzoic acid calcium salt, benzoic acid magnesium salt, benzoic acid potassium salt, benzoic acid sodium salt, and/or potassium acetate.

A24. The solution of any of paragraphs A22-A23, wherein the solution includes, consists of, or consists essentially of at least one of:
(i) at least 0.001 weight percent (wt %), at least 0.005 wt %, at least 0.01 wt %, at least 0.05 wt %, at least 0.1 wt %, at least 0.2 wt %, at least 0.4 wt %, at least 0.8 wt %, at least 1 wt %, at least 1.5 wt %, at least 2 wt %, at least 2.5 wt %, at least 3 wt %, at least 4 wt %, at least 5 wt %, at least 6 wt %, at least 7 wt %, or at least 8 wt % of the preservative component; and
(ii) at most 12 wt %, at most 10 wt %, at most 8 wt %, at most 6 wt %, at most 5 wt %, at most 4 wt %, at most 3 wt %, at most 2 wt %, at most 1 wt %, at most 0.8 wt %, at most 0.6 wt %, at most 0.4 wt %, or at most 0.2 wt % of the preservative component.

A25. The solution of any of paragraphs A22-A24, wherein the solution includes, consists of, or consists essentially of a mixture of preservative components, and further wherein the mixture of preservative components comprises at least one of:
(i) at least 1 weight percent (wt %), at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, or at least 99 wt % of each preservative component in the mixture of preservative components; and
(ii) at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, or at most 1 wt % of each preservative component in the mixture of preservative components.

A26. The solution of any of paragraphs A1-A25, wherein the solution further includes, consists of, or consists essentially of an ultraviolet (UV) protectant component.

A27. The solution of paragraph A26, wherein the UV protectant component includes, consists of, or consists essentially of at least one of talc, mica, quartz, kaolin, bentonite, attapulgite, montmorillonite, smectic clay, silica, cinnamaldehyde, cinnamic acid, methyl-cinnamate, benzyl cinnamate, octylmethoxy-cinnamate, zinc oxide, titanium oxide, cinnamic alcohol, menthyl anthranilate, ethyl anthranilate, ethyl p-aminobenzoate, homomenthyl salicylate, benzyl salicylate, 2-ethylhexyl salicylate, isoamyl salicylate, methyl salicylate, syctonemin, agave wax, and hippo sweat.

A28. The solution of any of paragraphs A26-A27, wherein the solution includes, consists of, or consists essentially of at least one of:
(i) at least 0.001 weight percent (wt %), at least 0.005 wt %, at least 0.01 wt %, at least 0.05 wt %, at least 0.1 wt %, at least 0.2 wt %, at least 0.4 wt %, at least 0.8 wt %, at least 1 wt %, at least 1.5 wt %, at least 2 wt %, at least 2.5 wt %, at least 3 wt %, at least 4 wt %, at least 5 wt %, at least 6 wt %, at least 7 wt %, or at least 8 wt % of the UV protectant component; and
(ii) at most 12 wt %, at most 10 wt %, at most 8 wt %, at most 6 wt %, at most 5 wt %, at most 4 wt %, at most 3 wt %, at most 2 wt %, at most 1 wt %, at most 0.8 wt %, at most 0.6 wt %, at most 0.4 wt %, or at most 0.2 wt % of the UV protectant component.

A29. The solution of any of paragraphs A26-A28, wherein the solution includes, consists of, or consists essentially of a mixture of UV protectant components, and further wherein the mixture of UV protectant components comprises at least one of:
(i) at least 1 weight percent (wt %), at least 2 wt %, at least 4 wt %, at least 6 wt %, at least 8 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, or at least 99 wt % of each UV protectant component in the mixture of UV protectant components; and
(ii) at most 99 wt %, at most 95 wt %, at most 90 wt %, at most 80 wt %, at most 70 wt %, at most 60 wt %, at most 50 wt %, at most 40 wt %, at most 30 wt %, at most 20 wt %, at most 10 wt %, at most 8 wt %, at most 6 wt %, at most 4 wt %, at most 2 wt %, or at most 1 wt % of each UV protectant component in the mixture of UV protectant components.

B1. A plant including an exogenous flexible film formed from the solution of any of paragraphs A1-A29.

B2. The plant of paragraph B1, wherein the plant includes at least one of a fruit, a vegetable, and a nut.

C1. A method of forming an exogenous flexible film on a plant, the method comprising:
spraying the solution of any of paragraphs A1-A29 on the plant; and
evaporating at least a fraction of the solvent from the solution to form the exogenous flexible film.

C2. The method of paragraph C1, wherein, prior to the spraying, the method further includes diluting the solution with additional solvent to form a sprayed solution, wherein the spraying includes spraying the sprayed solution on the plant.

C3. The method of any of paragraphs C1-C2, wherein the plant includes fruit, and further wherein the spraying includes spraying at least a threshold number of days prior to harvesting the fruit.

C4. The method of paragraph C3, wherein the threshold number of days is at least 10, at least 15, at least 20, at least 25, at least 30, at least 35, at least 40, at least 45, at least 50, at least 55, at least 60, at least 65, at least 70, at least 75, at least 80, at least 85, or at least 90 days.

C5. The method of any of paragraphs C1-C4, wherein the method further includes at least one of:
(i) reducing reactive oxygen species within the fruit via formation of the exogenous flexible film;
(ii) decreasing ethylene degradation within the fruit via formation of the exogenous flexible film;
(iii) increasing solids production within the fruit via formation of the exogenous flexible film;
(iv) decreasing microfractures within a cuticle of the fruit via formation of the exogenous flexible film;
(v) regulating ethylene release from the fruit via formation of the exogenous flexible film;
(vi) decreasing stress within the fruit via formation of the exogenous flexible film; and
(vii) enhancing photosynthesis within the plant via formation of the exogenous flexible film.

D1. A plant including an exogenous flexible film formed by performing the method of any of paragraphs C1-C5.

INDUSTRIAL APPLICABILITY

The solutions and methods disclosed herein are applicable to the horticulture and food products industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure

The invention claimed is:

1. A method of forming an exogenous flexible film on a plant, the method comprising:
    providing a concentrated solution that includes:
        (i) a solvent that comprises at least 58 wt % and at most 82 wt % of the concentrated solution, wherein the solvent includes water;
        (ii) a film forming matrix component that comprises at least 0.8 wt % and at most 2.2 wt % of the concentrated solution, wherein the film forming matrix component includes at least one of carboxymethylcellulose, hypromellose, chitosan, propyl cellulose, xanthan gum, guar gum, methacrylic-acrylic acid copolymers, alginic acid, polyvinyl acetate phthalate, polyvinyl pyrrolidone, and hypromellose acetate succinate;
        (iii) a hydrophobic barrier component that comprises at least 12 wt % and at most 25 wt % of the concentrated solution;
        (iv) a plasticizing component that comprises at least 4 wt % and at most 15 wt % of the concentrated solution; and
        (v) a film enhancing component that comprises at least 8 wt % and at most 18 wt % of the concentrated solution, wherein the film enhancing component includes at least one of potassium silicate, magnesium trisilicate, isopropyl myristate, oleic acid, vegetable oil, plant oil, dioctyl adipate, butyl stearate, aluminum magnesium silicate, glyceryl adipate, myristyl myristate, and isopropyl palmitate;
    diluting the concentrated solution with additional solvent to form a sprayed solution;
    spraying the sprayed solution on the plant, wherein the plant includes fruit and further wherein the spraying includes spraying at least 45 days prior to harvesting the fruit; and
    evaporating at least a fraction of the solvent from the sprayed solution to form the exogenous flexible film;
    wherein, in comparison to the plant not being treated with the exogeneous flexible film or being treated less than 45 days prior to harvest, the flexible film is effective in at least one of:
        (i) increasing fruit yield of the plant;
        (ii) decreasing stress on the plant;
        (iii) decreasing insect damage to the plant;
        (iv) decreasing disease incidence within the plant;
        (v) increasing fruit quality of the fruit;
        (vi) enhancing photosynthesis within the plant; and
        (vii) reducing reactive oxygen species within the fruit.

2. The method of claim 1, wherein the method further includes increasing shelf life of the fruit via formation of the exogenous flexible film.

3. The method of claim 1, wherein the method further includes increasing phytochemical activity in the plant via formation of the exogenous flexible film.

4. The method of claim 1, wherein the method further includes decreasing ethylene degradation within the fruit via formation of the exogenous flexible film.

5. The method of claim 1, wherein the method further includes increasing solids production within the fruit via formation of the exogenous flexible film.

6. The method of claim 1, wherein the method further includes regulating ethylene release from the fruit via formation of the exogenous flexible film.

7. The method of claim 1, wherein the method further includes decreasing microfractures within a cuticle of the fruit via formation of the exogenous flexible film.

8. The method of claim 1, wherein the spraying includes spraying at most 30 days after fruit set.

9. The method of claim 1, wherein the film forming matrix component includes at least one of cellulose acetate, hydroxyl ethyl cellulose, hydroxyl propyl cellulose, ethylcellulose, butylcellulose, alkylcelluloses, phthalate esters of cellulose, acetate esters of cellulose, cellulose acetate succinate, carboxyethylcellulose, cellulose acetate phthalate, cellulose, hypromellose phthalate, pectin, locust bean gum, gellan gum, gum Arabic, carrageenan, salts of alginic acid, acacia, tragacanth, polyvinyl acetate, polyvinyl alcohol, methacrylic-acrylic acid copolymer alkyl esters, methacrylic-acrylic acid copolymer ether, zein, hemicellulose, dextri maltose, dextrans, xylose, arabinoxylan, glucuronoxylan, glucomannan, xyloglucan, galactoglucomannan, arabinoglucoxylan, arabinogalactan, o-acetyl glactoglucomannan, amylopectin, rhamnoglacturonans, arabinnans, galactans, galacturonans, o-actyl-4-o-methylglucuronoxylopyranose, xylopranose, cornstarch, carboxymethyl cellulose ether, hyrdoxy propyl methyl cellulose, methyl cellulose, aluminum magnesium silicate, aluminum potassium silicate, bentonite, bentonite sodium, kaolin, montmorillonite, gum tragacanth, carob gum, dextrins, sodium alginate, citrus pectin, fructooligosaccharides, and gelatin.

10. The method of claim 1, wherein the hydrophobic barrier component includes at least one of hydrogenated palm oil, soya lecithin, carnauba wax, monostearin, diglycerin stearate, stearin, acetylated lanolin, tristearin, glycerides, monoglycerides, diglycerides, triglycerides, butyl stearate, stearyl alcohol, palmitic acid, oleic acid, polyoxyethylenes, polysorbates, alkylethoxylates, alkylphenoxyethoxylates, alkyl sulfonates, fatty acids, metal salts of fatty acids, sodium salts of fatty acids, potassium salts of fatty acids, zinc salts of fatty acids, calcium salts of fatty acids, polyglycerine mono fatty acid esters, polyglycerine di fatty acid esters, polyglycerine tri fatty acid esters, polyglycerine mono fatty acid ethers, polyglycerine di fatty acid ethers, polyglycerine tri fatty acid ethers, lignin, lignosulfonic acid, lignosulfonic acid metal salts, candelilla wax, ozokerite wax, hard butter, palm kernel oil, avocado oil, tallow, lard, coconut oil, hydrogenated vegetable oil, octyl dodecanol, oleyl alcohol, algae oil, hemp oil, poppy seed oil, palm oil, shea butter, cetostearyl alcohol, glyceryl monostearate, stearic acid, beeswax, lecithin, lanolin, cetyl alcohol, dioctyl sodium sulfosuccinate, pinene homopolymer, and p-nonyl phenols.

11. The method of claim 1, wherein the plasticizing component includes at least one of a plant extract, yucca extract, sorbitol, sorbitol solutions, sorbitan monostearate, sorbitan monooleate, polyoxyethylene-fatty acid esters, poly glycerol oleate, poly glyceryl 10 oleate, poly glyceryl 4 oleate, poly glyceryl 5 oleate, poly glyceryl 6 oleate, poly glyceryl 8 oleate, poly glyceryl stearate, poly glyceryl 6 stearate, poly glyceryl 2 stearate, poly glyceryl 4 stearate, lactic acid ethyl ester, lactic acid n-butyl ester, honey, and glycerin, propylene glycol, triacetin, dibutyl sebacate, lactic acid, lactamide, acetamide DEA, polysorbate 20, polysorbate 60, polysorbate 80, polyglyceryl-fatty acids, and polyethylene fatty acid esters.

12. The method of claim 1, wherein the film enhancing component includes at least one of aluminum calcium silicate, magnesium silicate, aluminum sodium silicate, dimethicone copolyol, dimethicone copolyol fatty acid esters, dimethicone copolyol fatty acid ethers, silicone glycol copolymer, isopropyl stearate, diisopropyladipate, diacetyl adipate, dibutyl adipate, soybean oil, ethyl oleate, lignin sulfate, salt of glycyrrhizinate, salts of myreth sulfate, castor oil dibehenate, ceteareth 15, ceteth 10, coc oleic DEA, diisotriacetyl adipate, hydrogenated menhaden acid, hydrogenated tallowoyl glutamic acid, isooctyl caprylate, isooctyl oleate, isooctyl stearate, isotricetyl stearate, lapyrium chloride, polyglyceryl oleate, polyglyceryl laurate, polyglyceryl stearate, polyglyceryl palmitate, lauryl glycoside, octyl glucoside, decyl glucoside, polysiloxy indolyl pyrrolidone phospholipid, isostearyl hydrolyzed collagen, almond oil, canola oil, castor oil, hydrogenated castor oil, corn oil, cottonseed oil, linseed oil, wheat oil, olive oil, peanut oil, rice bran oil, safflower oil, sesame oil, white mineral oil, wheat germ oil, rhamnolipids, mono rhamnolipids, di rhamnolipids, aluminum potassium silicate, aluminum sodium potassium silicate, cetyl myristate, and myristyl alcohol.

13. A plant treated according to the method of claim 1.

* * * * *